Patented Dec. 15, 1942

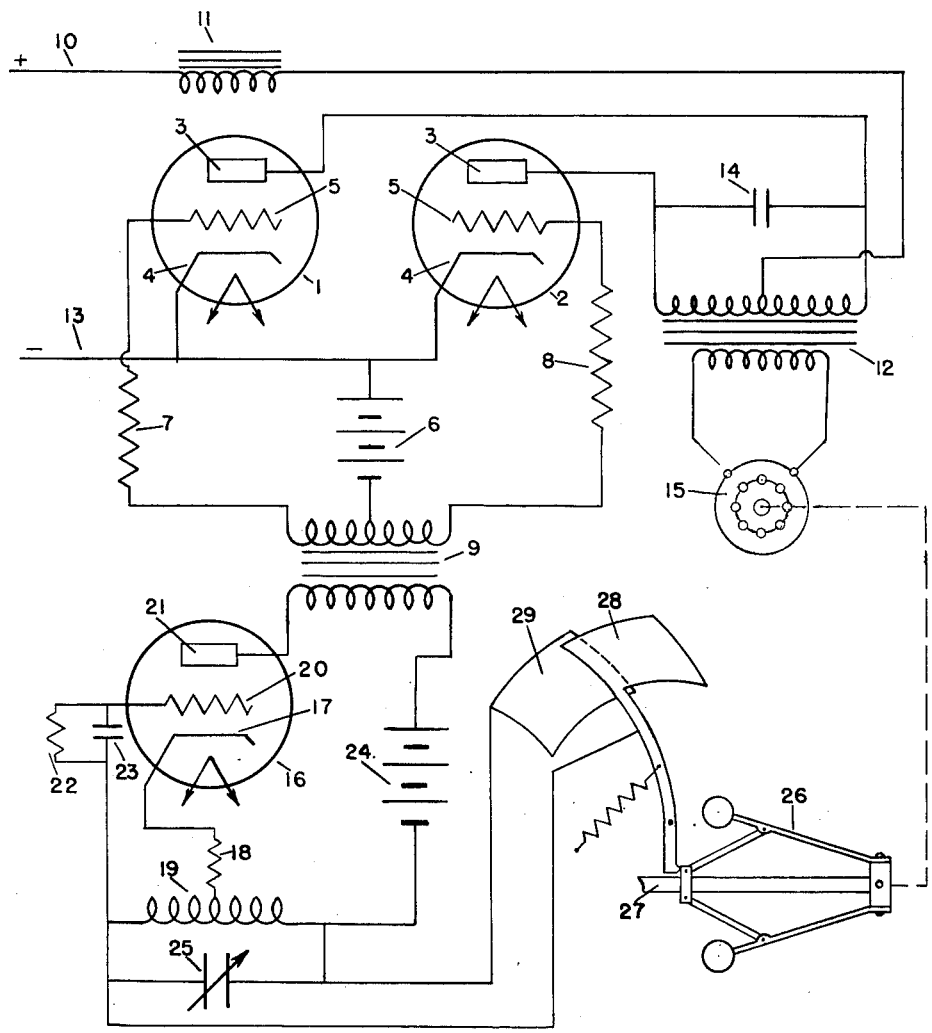

2,305,581

UNITED STATES PATENT OFFICE 2,305,581

MOTOR CONTROL SYSTEM

Paul W. Homrighous, Oak Park, Ill.

Application March 2, 1939, Serial No. 259,415

2 Claims. (Cl. 172—274)

This invention relates generally to motor control systems and more particularly to a novel form of incremental speed regulating apparatus for varying the speed of alternating current motors.

One of the principal objects of this invention is the provision of apparatus for changing the frequency in the supply circuit for varying the speed of motors.

Another object of this invention is the provision of speed regulating devices for controlling the frequency of the input circuit, thereby controlling the speed of the motor in such a circuit.

Various methods have been devised for regulating the speed of motors but none of these methods vary the frequency in the motor input circuit to hold the speed of a motor uniform under changing load conditions or fluctuating power input. Other objects and advantages will be apparent from the following detailed descriptions. Reference is made to the accompanying drawing in which:

The single figure of the drawing is a diagrammatic circuit drawing showing a familiar electronic inverter for changing from direct current to alternating current, an oscillator for controlling the inverter, and a governor on the motor shaft for controlling the frequency of the oscillator.

Referring to the drawing, the inverter circuit shown in Figure 1 is an electronic apparatus for obtaining alternating current output from a direct current input, which is definitely related in frequency and phase to the alternating current supplied to the grids.

The electronic devices or tubes, 1 and 2, may be of any of a number of types known in the art, but for purpose of the illustration they will be assumed to be gaseous triodes, each device being provided with an anode 3, a cathode 4, and a control electrode 5. The devices are shown with indirectly heated cathodes. Directly heated cathodes may be used, either of which type is heated by means of a transformer not shown. The control electrodes or grids 5 are normally biased negatively by the battery 6 through the resistances 7 and 8. The grid excitation voltage is applied from alternating current supplied through transformer 9, by an oscillator shown in Figure 1.

Direct current supply conductor 10 is connected to one terminal of choke coil 11 and the other terminal of the coil is connected to the mid point of the primary winding of the transformer 12. The anodes 3 of tubes 1 and 2 are connected also to this primary winding with a condenser 14, connected in parallel.

The cathodes of tubes 1 and 2 are connected to the negative conductor 13 from the source of direct current supply. The secondary winding of transformer 12 in the output circuit is connected to an induction motor 15.

The electronic device 16 in the oscillator ciruit, shown in Figure 1, which is a commonly known circuit in the art, is a gaseous triode type, having a cathode 17 indirectly heated from a transformer not shown. This tube may be of the direct heater type.

The cathode 17 is connected through a resistance 18 to a point between the grid end and anode end of the induction coil 19 which coil is common to both the grid 20 and anode 21 of tube 16. The usual grid leak 22 and condenser 23 are in the grid circuit, and a battery 24 is shown connected to the anode through the winding of transformer 9 and to the cathode through part of induction coil 19.

The frequency of oscillation is determined chiefly by the coil 19 and the variable condenser 25. Therefore, varying the capacity of condenser 25 will vary the frequency in the oscillator circuit, which frequency is applied through the windings of transformer 9 to the grids 5 of tubes 1 and 2 so that one is postitive when the other is negative. During the positive half cycle of grid excitation, tube 1 will conduct while the plate of tube 2 is at line potential.

When the grid of tube 1 swings positive tube 1 starts conducting; tube 2 is prevented from firing because at the same instant the grid of tube 2 is negative. Once the tube fires, the grid loses and cannot regain control until the tube stops conducting. The plates of both tubes are tied together by a condenser 14, which has a time constant high enough to allow for deionization of the tube. Tube 2 starts conducting when its grid swings positive. Both tubes conduct for an instant until condenser 14 discharges. In discharging, the condenser drives the current in tube 1 to zero and stops the tube from conducting. This process is continued from one tube to the other thereby producing an alternating current approximating sine wave form.

From the formula F=P/2×R. P. M./60
Where F=frequency
P=number of poles
R. P. M.=revolution per minute It will be seen that the motor speed can be varied by changing the number of poles or by varying the frequency.

From the above equation it is evident that controlling the frequency will give incremental speed control of the motor.

Referring to Fig. 1 I have shown a speed operated device or centrifugal type governor 26, that is mounted on the end of motor shaft 27 for changing the capacity of the condenser comprising the plates 28 and 29. The rotating member 28 which may be made up of one or several parallel plates is rotated by the action of the governor 26 into parallel alignment with one or several stationary plates 29, thus forming a variable condenser which is shown connected in parallel with condenser 25. Therefore should the motor speed up from light load or changes in the capacities of inverter or oscillator circuits the governor through the action of centrifugal force would cause more capacity to be included in the tuned oscillator circuit thereby lowering the frequency which in turn lowers the R. P. M. of motor. The capacity of the tuned oscillator circuit would be lowered by action of governor and the frequency increased should the motor slow down. Whatever the speed at which the motor is set to run by the condenser 25, the governor will operate to maintain that speed constant.

I do not intend that the present invention shall be restricted to the arrangement of parts, circuit connections, or to the particular form as herein set forth, but contemplate all modifications and changes therein within the terms of the appended claims.

Having thus described my invention, I claim:

1. In a motor control system, a direct current supply circuit, an induction motor, means for transmitting energy therebetween including a plurality of electron tubes provided with control grids, a source of electrical oscillations for exciting said control grids to determine the frequency of alternating current delivered by said means for transmitting energy, said source including an electron tube provided with a control grid, a tuned circuit connected to said last mentioned control grid and including a variable condenser, centrifugal governor means driven by said motor and mechanically coupled to said variable condenser to vary the frequency of said electric oscillations in accordance with motor speed variations to maintain the speed of said motor constant.

2. In a motor control system, a direct current supply circuit, an alternating current motor provided with a movable speed operated device, means for transmitting energy therebetween including a plurality of electron tubes provided with control grids, a source of electrical oscillations for exciting said control grids to determine the frequency of alternating current delivered by said means for transmitting energy, said source including an electron tube provided with a control grid, a tuned circuit connected to said last mentioned control grid, and tuning means responsive to the movement of said device for variably tuning said last mentioned circuit to vary the frequency of said electrical oscillations in accordance with motor speed variations to maintain the speed of said motor constant.

PAUL W. HOMRIGHOUS.